US012744681B2

(12) United States Patent
King et al.

(10) Patent No.: US 12,744,681 B2
(45) Date of Patent: Sep. 22, 2026

(54) DATA INTEGRITY MANAGEMENT IN CHANGING NETWORK CONDITIONS TRIGGERED BY DATA HARVESTING FOR RETROSPECTIVE DECRYPTION

(71) Applicant: Bank of America Corporation, Charlotte, NC (US)

(72) Inventors: Adam Kristian King, Fort Mill, SC (US); James Siekman, Charlotte, NC (US); Sanjay Lohar, Charlotte, NC (US); Matthew Bryant, Mount Holly, NC (US); Catherine Cunningham, Charlotte, NC (US); Takiyah Watford, Charlotte, NC (US); Elizabeth Swanzy-Parker, Charlotte, NC (US); Peter Nein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 58 days.

(21) Appl. No.: 18/800,774

(22) Filed: Aug. 12, 2024

(65) Prior Publication Data

US 2026/0046151 A1 Feb. 12, 2026

(51) Int. Cl.
*H04L 9/32* (2006.01)
*H04L 9/40* (2022.01)

(52) U.S. Cl.
CPC .......... *H04L 9/3297* (2013.01); *H04L 9/3247* (2013.01); *H04L 63/0428* (2013.01); *H04L 63/10* (2013.01); *H04L 63/123* (2013.01)

(58) Field of Classification Search
CPC ..... H04L 9/3297; H04L 9/3247; H04L 63/10; H04L 63/0428; H04L 63/123
See application file for complete search history.

(56) References Cited

U.S. PATENT DOCUMENTS

| | | | | |
|---|---|---|---|---|
| 2022/0360594 | A1* | 11/2022 | Cosgrove | H04L 63/1416 |
| 2023/0074843 | A1* | 3/2023 | D'souza | H04L 9/0861 |
| 2023/0227561 | A1* | 7/2023 | Walcheck | C07K 14/5443 424/136.1 |
| 2024/0392008 | A1* | 11/2024 | Gauthier | C07K 14/55 |
| 2025/0260565 | A1* | 8/2025 | Abdelsamie | H04L 9/3239 |
| 2026/0058985 | A1* | 2/2026 | King | H04L 63/1425 |

* cited by examiner

*Primary Examiner* — Hadi S Armouche
(74) *Attorney, Agent, or Firm* — Weiss & Arons LLP

(57) ABSTRACT

A method for enhancing security of data by introducing a layer of data integrity management that adapts to changing conditions within a data network. The method may include using a processor located and operated by a first party to encrypt a data packet, embed an algorithm into the encrypted data packet, store the latter, and/or transfer the latter to a second party. The algorithm may validate at a predetermined frequency the encrypted data packet and/or determine its location in its environment. When the algorithm indicates an issue with the encrypted data packet, the latter may provide an alert message that includes the nature of the breach, a timestamp of when it was noticed, and/or an identification of the affected encrypted data packet. The latter may also gather information about its environment and provide it back to the processor, and initiate data lockdown and access restriction back at its origin.

20 Claims, 5 Drawing Sheets

DATA INTEGRITY MANAGEMENT IN CHANGING NETWORK CONDITIONS TRIGGERED BY DATA HARVESTING FOR RETROSPECTIVE DECRYPTION

FIELD OF TECHNOLOGY

Aspects of the disclosure relate to the use of data integrity management to secure data under changing network conditions.

BACKGROUND

Data breaches, leaks, and hacks pose significant threats to the security and integrity of sensitive and confidential information. These incidents result in widespread damage as compromised data is misappropriated. Compromised data is misappropriated by selling the data or access to the data, for example, on the dark web. Existing security measures struggle to contain the aftermath of such incidents, allowing unauthorized code to proliferate. There is a pressing need for a proactive solution that can mitigate the impact of data breaches, thereby safeguarding sensitive and confidential information from malicious activity and unauthorized access.

Computational power continues to grow exponentially. Existing encryption methods face a persistent challenge from post-quantum computing vulnerability encapsulated in the phrase "harvest now, decrypt later," where encrypted data could be stored indefinitely, awaiting retrospective decryption. Retrospective decryption poses a significant security risk, as advances in computing power and decryption techniques compromise sensitive and confidential encrypted information over time.

There is a need to provide improved data security after data has been misappropriated by a malicious third party.

There is a need to provide improved data security as stolen data finds itself in differing environments.

There is a need to provide improved data security after data has been taken from the data owner and stored on a third party server awaiting improved technology to decrypt the data.

SUMMARY

It is an object of the invention to provide data security after data has been misappropriated by a malicious third party.

It is a further object of the invention to provide data security as stolen data finds itself in differing environments.

It is another object of the invention to provide data security after data has been taken from the data owner and stored on a third-party server awaiting improved technology to decrypt the data.

A method for enhancing security of data by introducing a layer of data integrity management that adapts to changing conditions within a data network.

The method may include using a processor to encrypt a data packet to create an encrypted data packet. The processor may be located and operated by a first party.

The method may include using the processor to embed an algorithm into the encrypted data packet. The algorithm may perform the steps that include validating the encrypted data packet against predefined criteria. The predefined criteria may include cryptographic signatures, access permissions, or both. The steps may include determining if the encrypted data packet is within a predetermined environment.

The processor may store the encrypted data packet in a memory storage device that is in electronic communication with the processor.

The processor may transfer the encrypted data from the memory storage device to a second party.

The encrypted data packet may run the algorithm at a predetermined frequency to validate the encrypted data packet, to determine if the encrypted data packet is within the predetermined environment, or both.

The predetermined frequency with which the algorithm is run may be set to be more frequent for more confidential information and less frequent for less confidential information. Information that is more confidential may include data that if obtained by a malicious third party, may cause excessive harm to the owner of the data. Information that is less confidential may include data that if obtained by a malicious third party, may only cause minimal to moderate harm to the owner of the data.

When the validation of the encrypted data packet fails and/or when the encrypted data packet is outside of the predetermined environment, the encrypted data packet may initiate the algorithm to cause the destruction of the encrypted data packet. The destruction of the encrypted data packet may be irreversible.

The encrypted packet may notify an authorized party with an alert message in real-time. The alert message may include the nature of the breach, a timestamp of when the breach was noticed, an identification of the encrypted data packet that has been affected, and/or other information. Notifying in real-time may include notification as soon as there is a detection of the failed validation attempt. Notifying in real-time may include notification as soon as there is a detection that the data packet is outside of the predetermined environment.

The predetermined environment may include locations related to the first party. It may include locations related to the second party. It may include locations along a transportation route such as an electronic transportation route between the first party and the second party.

Encrypting the data packet may include use of an encryption standard. The encryption standard may include the Triple Data Encryption Standard ("DES"), the Advanced Encryption Standard ("AES"), the Rivest, Shamir, and Adleman ("RSA") Security, Blowfish, Twofish, and/or combination thereof.

The encryption standard may include a post-quantum cryptography ("PQC") standard. The encryption standard and/or PQC may include Cryptographic Suite for Algebraic Lattices ("CRYSTALS")-Kyber, CRYSTALS-Dilithium, SPHINCS+, FALCON, and/or combinations thereof.

The predefined criteria may include time-sensitive markers.

Cryptographic signatures may include a digital signature, an electronic signature, or both.

The access permissions may include authorizations given to access the encrypted data packets.

The destruction of the encrypted data packet may include the degrading of the integrity of data in the encrypted data packet. Degrading the integrity of the data in the encrypted data packet may make it futile to interpret or reconstruct the data in the encrypted data packet.

The algorithm that causes the destruction of the encrypted data packet when the validation of the encrypted data packet fails may be unique to the encrypted data packet.

The alert message may include a status of the encrypted data packet and/or a location of the encrypted data packet.

The algorithm may validate the encrypted data packet by communicating with a party. The party may be the party that initiated the creation of the encrypted data packet. The validation may be through an electronic heartbeat or other communication. The electronic heartbeat or other communication may come from a source external to the encrypted data packet.

Part of the electronic heartbeat or other communications may continuously or substantially continuously fill in a gap or otherwise provide information for maintaining the encrypted data packet. When the electronic heartbeat signal fails, or other communication drops, the encrypted data packet may effectively deconstruct, crumble, and/or become unreadable. This deconstruction, crumbling, and/or unreadability may be caused by an algorithm that is prompted by the failure of the encrypted data packet to receive the electronic heartbeat or other communication.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
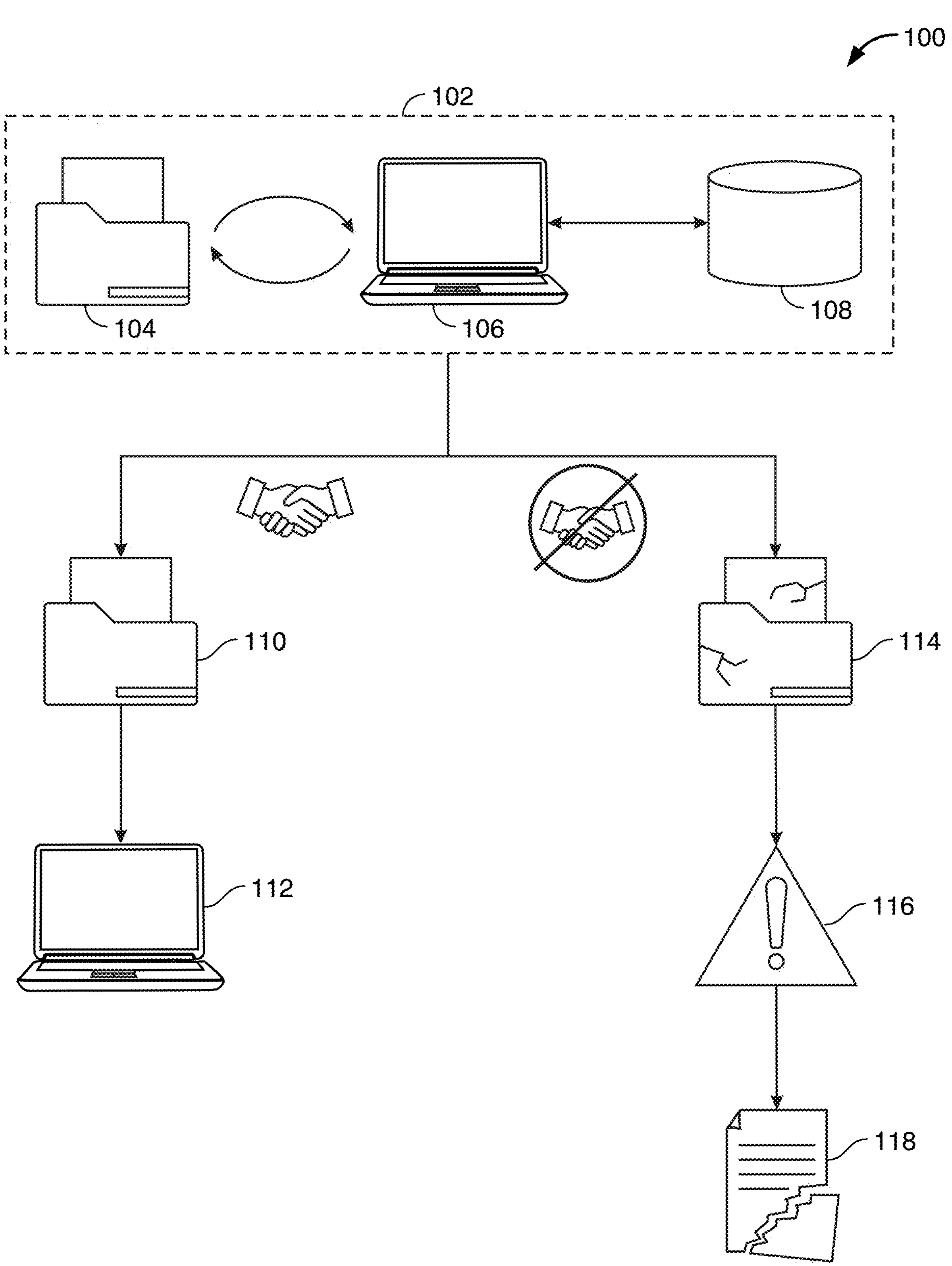
FIG. 1 shows an illustrative block diagram in accordance with principles of the disclosure.

The apparatus and method may include a system for enhancing security of data by introducing a layer of data integrity management that adapts to changing conditions within a data network. The apparatus and method may self-destruct a data packet whose security has been compromised.

The system may include a processor. The processor may be located by a first party. The processor may be operated by the first party. The system may include a data packet. The system may include a memory storage device. The system may include an algorithm.

The processor may include an electrical component that performs operations on an external data source. The external data source may include memory or a stream of data such as data packets.

In computer networking, a data packet may include a small segment of a larger message. Data sent over a computer network, such as the Internet, may be divided into data packets. These data packets may then be recombined by a computer or device that receives them.

The data packet may include a formatted unit of data carried by a packet-switched network. A data packet may include control information and user data. The latter may be referred to as a payload. Control information may provide data for delivering the payload. This may include source and destination network addresses, error detection codes, and/or sequencing information. Control information may, for example, contain is found in packet headers and trailers.

The memory storage device, or storage unit, may be a part of a computer system that also includes the processor. The computer system may be employed to store data such as information and instructions, to be processed by the processor.

The algorithm may include a set of instructions designed to accomplish a task. The algorithm may take inputs, run them systematically through a series of steps, and provide one or more outputs. The algorithm may be associated with a data packet. The algorithm may be used to accomplish a variety of computational tasks.

The processor may be configured to encrypt a data packet to create an encrypted data packet. The processor may be located and operated by a first party.

Encrypting a data packet may contribute to maintaining its content as confidential and private. A third party that captures a data packet to eavesdrop on network traffic between the two locations may be unable to read them. The third party may store the encrypted data packet awaiting improvements in decryption with the hope that what cannot be decrypted today may be decrypted tomorrow.

The processor may be configured to embed an algorithm into the encrypted data packet. A data packet may contain a header, a payload that may also be called the body or data, and a trailer that may also be called the footer. The payload may contain enough storage size to include the algorithm. The algorithm may perform the step of validation of the encrypted data packet against predefined criteria.

The payload of the data packet may contribute unique functionality to the data packet. For example, the design of the payload may include a high-level security and integrity management that may protect the data packet when the latter finds itself in unauthorized or unauthenticated environments. Several components of the payload may contribute.

First may be time-sensitive markers. These may be cryptographically secured timestamps embedded within the data of the data packet. These markers may serve as checkpoints for validation against the source environment's security standards. If the markers show times outside of an acceptable range, or if the geographical checks fail, it indicates potential unauthorized access or movement of the data, triggering further security protocols.

Second may be cryptographic signatures and erosion algorithms. Each data packet may carry a unique cryptographic signature that verifies its authenticity and integrity. In parallel, an erosion algorithm may be designed to gradually corrupt the data irreversibly if unauthorized access is confirmed. This alteration may make the data unintelligible over time, rendering it useless to unauthorized interceptors.

Third may geolocation data. Each data packet may contain, encoded within the payload, geolocation data. The geolocation data may help in determining whether the data has moved outside its authorized geographic or network boundary. That may be an essential feature for enforcing data governance and compliance with regional laws and regulations.

Functionalities may be coded into the payload of each data packet. For example, the functionalities of validation, location determination, and/or data erosion may be integrated into the payload of each data packet. These functionalities may be inherent components of the data's structure, activated under specific conditions. These functionalities may be tagged onto the data, activated under specific conditions.

One functionality may include integrated validation checks. The system may periodically check the embedded cryptographic signatures and time-sensitive markers against the source environment's parameters to ensure that the data remains within its secure, designated boundaries.

Another functionality may include activation of the erosion algorithm. The erosion algorithm may be embedded directly within the data packet. The erosion algorithm may be programmed to activate when unauthorized access is detected and/or when a check-in fails. The data packet itself may contain the logic and/or capability to begin self-destruction.

Further functionality may include real-time location checks. Geolocation data may be embedded within each packet. This geolocation data may aid in real-time monitoring and/or enforcement of geographical and network boundaries that may be crucial for compliance and security.

The predefined criteria may include cryptographic signatures. A cryptographic signature may include a digital signature. It may include access permissions. It may include both cryptographic signatures and access permissions.

The step of validation may check for the validity of the data in the encrypted data packet. Using a set of rules, the validation may check whether the data is within an acceptable range of values. The validation step may ensure that a party accessing the encrypted data packet is an accepted party or a potentially malicious party.

The algorithm may perform the step of determination if the encrypted data packet is within a predetermined environment.

The processor may be configured to store the encrypted data packet in a memory storage device that is in electronic communication with the processor. The processor may be configured to transfer the encrypted data packet from the memory storage device to a second party.

The processor may be configured to transport the encrypted data packet without storing it in a memory storage device. The processor may be configured to directly transfer the encrypted data packet to a second party.

The encrypted data packet may be configured to run the algorithm at a predetermined frequency to validate the encrypted data packet, to determine if the encrypted data packet is within the predetermined environment, or both.

The predetermined frequency with which the algorithm is run may be set to be more frequent for more confidential information and less frequent for less confidential information. More confidential information may include data that if obtained by a malicious third party, may cause excessive harm to the owner of the data. Less confidential information may include data that if obtained by a malicious third party, may only cause minimal to moderate harm to the owner of the data.

When the validation of the encrypted data packet fails, the encrypted data packet may be configured to initiate the algorithm to cause the destruction of the encrypted data packet. When the encrypted data packet is outside of the predetermined environment, the encrypted data packet may be configured to initiate the algorithm to cause the destruction of the encrypted data packet. The destruction of the encrypted data packet may be irreversible.

The destruction of the encrypted data packet may include fragmenting the packet, crumbling the packet, and/or breaking down the packet into something smaller. The result of these actions may result in destruction of the encrypted data packet.

The encrypted data packet may notify an authorized party with an alert message in real-time. The authorized party may be the party that originates the encrypted data packet, the destination party of the encrypted data packet, and/or another party. The alert message may include the nature of the breach. It may include a timestamp of when the breach was noticed. It may include an identification of the encrypted data packet that has been affected.

Notifying the authorized party in real-time may include notifying as soon as there is a detection of the failed validation attempt. It may include notifying as soon as there is a detection that the data packet is outside of the predetermined environment.

Real-time may include a system in which input data is processed within milliseconds so that it is available virtually immediately as feedback.

The predetermined environment may include locations related to the first party. It may include locations related to the second party. It may include locations along a transportation route between the first party and the second party.

A data file may include many data packets. The data packets may take the same network path to the same destination or different network paths to the same destination. In certain protocols, data packets may need to arrive at their final destinations in their correct order, even if each packet took a different route to get there. In other protocols, the order in which the data packets are received may not be restricted.

The encrypted data packet may run the algorithm at a predetermined frequency to validate the encrypted data packet, to determine if the encrypted data packet is within the predetermined environment, or both.

The predetermined frequency with which the algorithm is run may be set to be more frequent for more confidential information and less frequent for less confidential information. Information that is more confidential may include data that if obtained by a malicious third party, may cause excessive harm to the owner of the data. Information that is less confidential may include data that if obtained by a malicious third party, may only cause minimal to moderate harm to the owner of the data.

Encrypting the data packet may include use of an encryption standard. The encryption standard may include the Triple Data Encryption Standard ("DES"), the Advanced Encryption Standard ("AES"), the Rivest, Shamir, and Adleman ("RSA") Security, Blowfish, Twofish, and/or combination thereof. The encryption standard may include other encryption standards.

Encrypting the data packet may include use of an encryption standard. Encrypting the data packet may include use of a post-quantum cryptography ("PQC") standard. The encryption standard and/or PQC may include Cryptographic Suite for Algebraic Lattices ("CRYSTALS")-Kyber, CRYSTALS-Dilithium, SPHINCS+, FALCON, and/or combinations thereof. A goal of PQC may include the development of cryptographic systems that are secure against both quantum and classical computers. Another goal may include that the PQC can interoperate with existing communications protocols and networks.

The predefined criteria may include time-sensitive markers. Each encrypted data packet may be embedded with time-sensitive markers. Time-sensitive markers may include cryptographic signatures and/or access permissions. The time-sensitive markets may trigger destruction of the encrypted data packet when the data is detected outside of its designated environment.

The cryptographic signatures may include a digital signature and/or an electronic signature.

The access permissions may include authorizations given to access the encrypted data packets.

The destruction of the encrypted data packet may include the degrading of the integrity of data in the encrypted data packet. Degrading the integrity of the data in the encrypted data packet may make it futile to interpret or reconstruct the data in the encrypted data packet.

The algorithm that causes the destruction of the encrypted data packet when the validation of the encrypted data packet fails may be unique to the encrypted data packet.

The alert message may include a status of the encrypted data packet and/or a location of the encrypted data packet.

The algorithm may validate the encrypted data packet by communicating with a party. The party may be the party that initiated the creation of the encrypted data packet. The validation may be through an electronic heartbeat or other communication. The electronic heartbeat or other communication may come from a source external to the encrypted data packet.

Part of the electronic heartbeat or other communications may continuously or substantially continuously fill in a gap or otherwise provide information for maintaining the encrypted data packet. When the electronic heartbeat signal fails, or other communication drops, the encrypted data packet may effectively deconstruct, crumble, and/or become unreadable. This deconstruction, crumbling, and/or unreadability may be caused by an algorithm that is prompted by the failure of the encrypted data packet to receive the electronic heartbeat or other communication.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative block diagram 100. Illustrative block diagram 100 may show validation check 102. Validation check 102 may include encrypted data packet 104. Validation check 102 may include processor 106 of a first party. Validation check 102 may include data storage unit 108. The point of origin of encrypted data packet 104 may be processor 106, data storage unit 108, or both in electronic communication with each other.

Validation check 102 may be successful. Successful validation may result in the encrypted data 110 being transported to processor 112 of a second party.

Validation check 102 may be unsuccessful. An unsuccessful validation may result in triggering a necrotic algorithm resulting in a partially degraded encrypted data packet 114.

As the necrotic algorithm continues, an alert message 116 may be sent back to a point of origin. The point of origin may include processor 106, data storage unit 108, both in electronic communication with each other.

Finally, the necrotic algorithm may result in self-degraded encrypted data packet 118.

Figure 2:
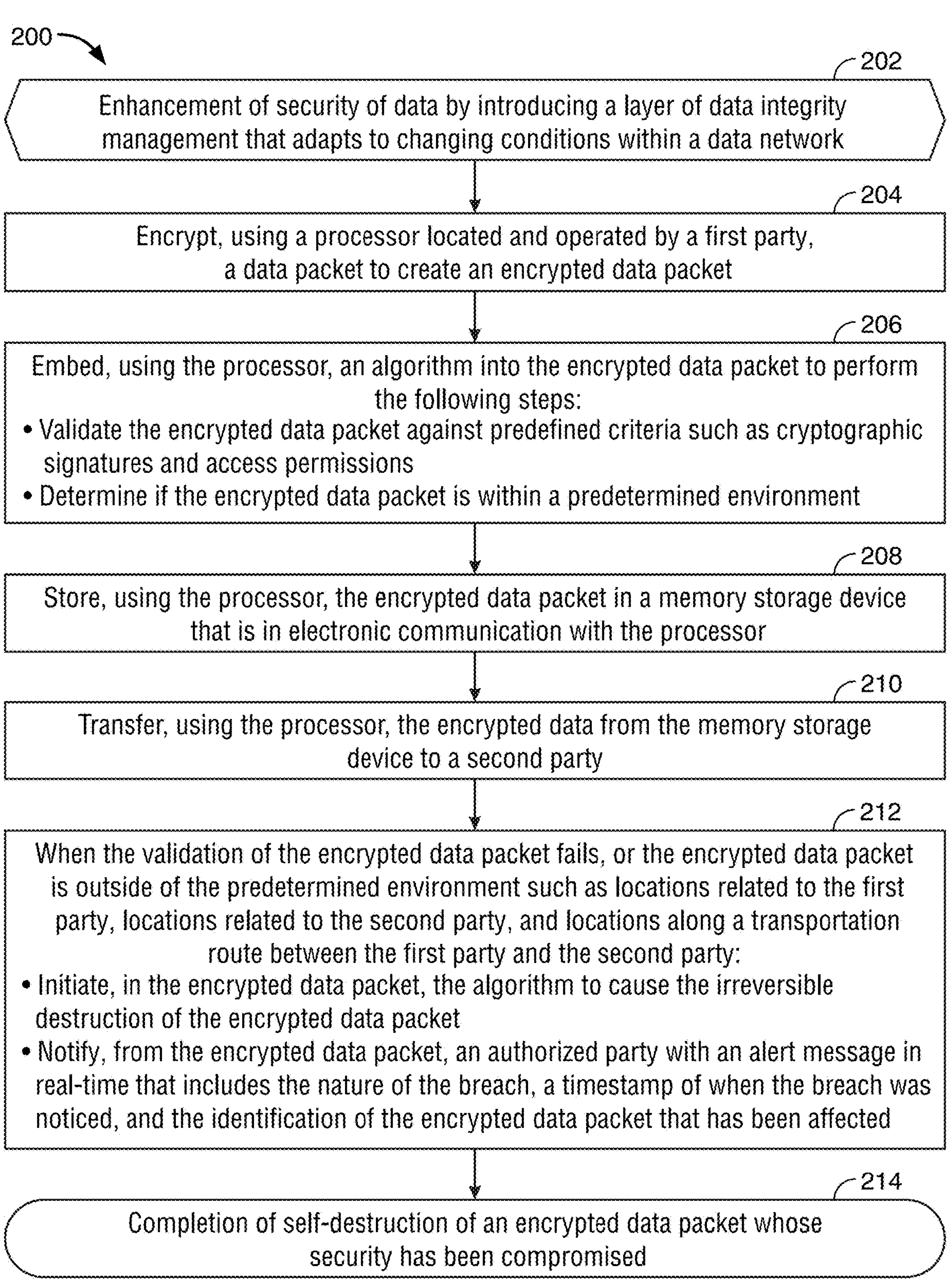
FIG. 2 shows an illustrative flowchart in accordance with principles of the disclosure.

FIG. 2 shows illustrative flowchart 200, beginning at step 202, that may provide a process for enhancing the security of data by introducing a layer of data integrity management that adapts to changing conditions within a data network.

At step 204, a processor may be located and operated by a first party. The processor may encrypt a data packet to create an encrypted data packet.

At step 206, the processor may embed an algorithm into the encrypted data packet to validate the encrypted data packet against predefined criteria such as cryptographic signatures and/or access permissions. The embedded algorithm may determine if the encrypted data packet is within a predetermined environment. The predetermined environment may include locations related to the first party. It may include locations related to a second party. It may include locations along a transportation route between the first party and the second party.

At step 208, the processor may store the encrypted data packet in a memory storage device that is in electronic communication with the processor.

At step 210, the processor may transfer the encrypted data from the memory storage device to a second party.

At step 212, the encrypted data packet may initiate the algorithm to cause the irreversible destruction of the encrypted data packet when the validation of the encrypted data packet fails. The encrypted data packet may initiate the algorithm to cause the irreversible destruction of the encrypted data packet when the encrypted data packet is detected outside of the predetermined environment. Outside of the predetermined environment may include being outside of locations related to the first party, locations related to the second party, and/or locations along a transportation route between the first party and the second party.

When the validation of the encrypted data packet fails and/or the encrypted data packet is detected outside of the predetermined environment, the encrypted data packet may notify an authorized party with an alert message in real-time. The alert message may include the nature of the breach, a timestamp of when the breach was noticed, and/or the identification of the encrypted data packet that has been affected.

At step 214, the self-destruction of the compromised encrypted data packet may be completed.

Figure 3:
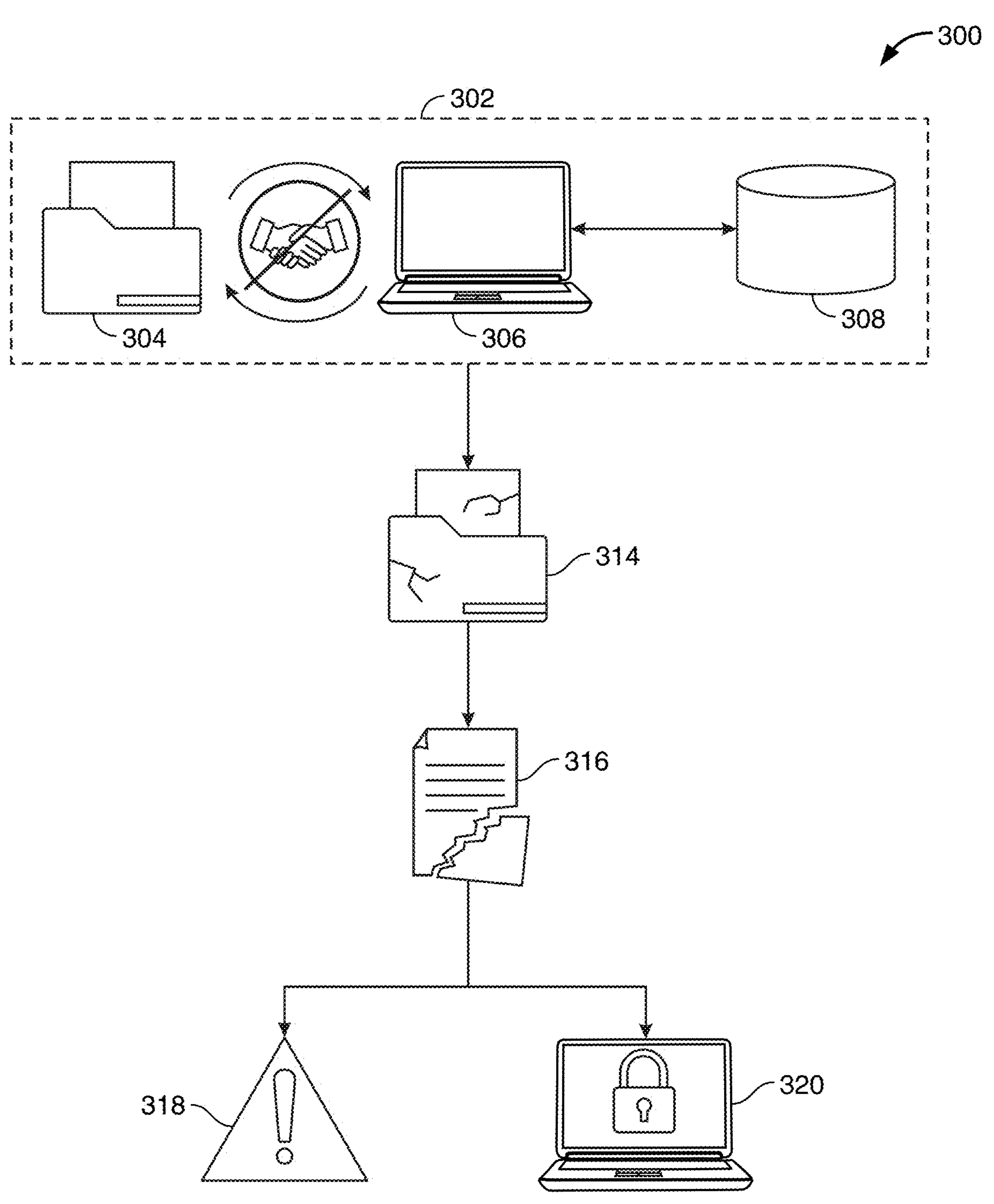
FIG. 3 shows an illustrative block diagram in accordance with principles of the disclosure.

FIG. 3 shows illustrative block diagram 300. Illustrative block diagram 300 may show a scenario where an encrypted data packet containing sensitive data is intercepted by a malicious actor. The sensitive data may include sensitive medical data, personal identification data, financial data, or the like. Illustrative block diagram 300 may detect the interception and protect the owner of the data.

Validation check 302 may include encrypted data packet 304. Validation check 302 may include processor 306. Validation check 302 may include data storage unit 308. The point of origin of encrypted data packet 304 may be processor 306, data storage unit 308, or both in electronic communication with each other.

Validation check 302 may be unsuccessful. An unsuccessful validation check may be due to a malicious actor intercepting the data packet.

Upon interception, the data packet may fail to validate its cryptographic signature during its routine check-in with the source server leading to an unsuccessful validation check. The failed validation check may be due to tampering by the malicious actor and/or due to redirecting to another location leading to a location anomaly. The failed validation check may lead to an initial trigger.

The initial trigger may activate erosion algorithm 314. Erosion algorithm 314 may be embedded within the data packet. Erosion algorithm 314 may begin to alter the data packet's structure systematically and/or irreversibly. Erosion algorithm 314 may use a complex cryptographic transformation that scrambles and degrades data in the data packet.

Erosion algorithm 314 may proceed to progressive data destruction 316. Over time, the algorithm may intensify the destruction process, ensuring that even if some portions of the data are unencrypted and/or accessed, they are incomprehensible. The data's integrity and/or structure may be compromised. The compromise may be so extensive that reconstruction and/or decryption is impossible.

Concurrent to the initial trigger, activation of the erosion algorithm 314, and/or the progressive data destruction 316, the system may send alert 318 to a security team. Alert 318 may include details of the breach. Details may include a time, nature, and/or other specifics of the anomaly detected.

If set protocols are in place, further automated actions may be implemented such as lockdown 320 and/or network isolation. Initiation of these further automated actions may prevent widespread damage.

Figure 4:
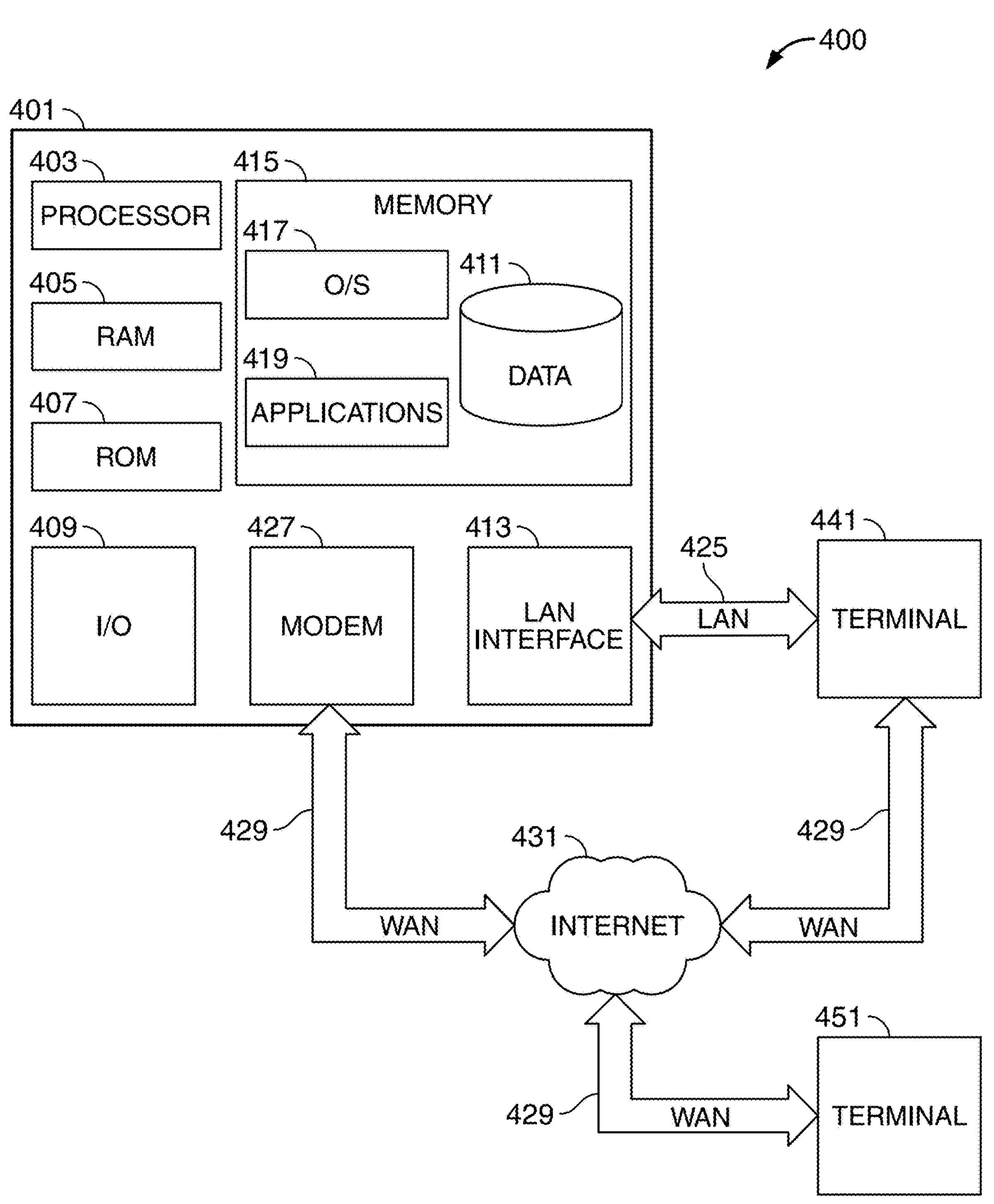
FIG. 4 shows an illustrative block diagram in accordance with principles of the disclosure.

FIG. 4 shows illustrative block diagram 400. Illustrative block diagram 400 may show an illustrative block diagram of apparatus 400 that includes a computer or computer system 401. Apparatus 400 may include one or more features of the apparatus shown in FIG. 1. Computer 401 may alternatively be referred to herein as a "computing device" or "computing system". Computer 401 may be a quantum computer or part of a quantum computer. Elements of apparatus 400, including computer 401, may be used to implement various aspects of the apparatus and methods disclosed herein. A "user" of apparatus 400 or computer 401 may include other computer systems or servers or computing devices, such as the program described herein.

Computer 401 may have one or more "N"-qubit processors as well as standard microprocessors 403 for controlling the operation of the device and its associated components, and may include RAM 405, ROM 407, input/output module 409, and a memory 415. The processors 403 may also execute all software running on the computer 401—e.g., the operating system 417 and applications 419. The processors 403 may establish quantum entanglement between qubits such as qubits in different locations. The processors 403 may run QEC. QEC may maintain coherence between entangled qubits. The processors 403 may establish correlation between qubits in different locations. Other components commonly used for computers, such as EEPROM or Flash memory or any other suitable components, may also be part of the computer 401.

Memory 415 may be comprised of any suitable permanent storage technology—e.g., a hard drive or other non-transitory memory. The ROM 407 and RAM 405 may be included as all or part of memory 415. Memory 415 may store software including the operating system 417 and application(s) 419 along with any other data 411 (e.g., historical data, configuration files) needed for the operation of the apparatus 400. Memory 415 may also store applications and data. Alternatively, some or all of computer executable instructions (alternatively referred to as "code") may be embodied in hardware or firmware (not shown). Microprocessor 403 may execute the instructions embodied by the software and code to perform various functions.

Memory 415 may store data as quantum states. Data may be transferred between qubits through quantum entanglement. Data may be stored on qubits as quantum states that are correlated to quantum states on other qubits. Data may be transferred between qubits through quantum entanglement.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) along with any data needed for the operation of the apparatus. The data may also be stored in cache memory, or any other suitable memory.

An input/output ("I/O") module 409 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 401, the processor or processors 403 may execute the instructions in all or some of the operating system 417, any applications 419 in the memory 415, any other code necessary to perform the functions in this disclosure, and any other code embodied in hardware or firmware (not shown).

In an embodiment, apparatus 400 may consist of multiple computers 401, along with other devices. A computer 401 may be a mobile computing device such as a smartphone or tablet.

Apparatus 400 may be connected to other systems, computers, servers, devices, and/or the Internet 431 via a local area network (LAN) interface 413.

Apparatus 400 may operate in a networked environment supporting connections to one or more remote computers and servers, such as terminals 441 and 451, including, in general, the Internet and "cloud". These remote computers and servers, terminals 441 and 451 (as well as other terminals, not shown) may be other quantum computers. Quantum computers may interact with each other over a quantum network. Quantum computers may interact with each other through quantum entanglement. References to the "cloud" in this disclosure may refer to the Internet, which is a world-wide network. "Cloud-based applications" may refer to applications located on a server remote from a user, wherein some or all the application data, logic, and instructions are located on the Internet and are not located on a user's local device. Cloud-based applications may be accessed via any type of internet connection (e.g., cellular or wi-fi).

Terminals 441 and 451 may be other quantum computers or servers that include many, or all the elements described above relative to apparatus 400. The network connections depicted in FIG. 4 include a local area network (LAN) 425 and a wide area network (WAN) 429 but may also include other networks. Computer 401 may include a network interface controller (not shown), which may include a modem 427 and LAN interface or adapter 413, as well as other components and adapters (not shown). When used in a LAN networking environment, computer 401 is connected to LAN 425 through a LAN interface or adapter 413. When used in a WAN networking environment, computer 401 may include a modem 427 or other means for establishing communications over WAN 429, such as Internet 431. The modem 427 and/or LAN interface 413 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 419 (which may be alternatively referred to herein as "plugins," "applications," or "apps") may include computer executable instructions for a quantum authentication program and security protocols, as well as other programs. In an embodiment, one or more programs, or aspects of a program, may use one or more quantum authentication and AI/ML algorithm(s). The various tasks may be related to authenticating a user with a quantum computer.

Computer 401 may also include various other components, such as a battery (not shown), speaker (not shown), a network interface controller (not shown), and/or antennas (not shown).

Any information described above in connection with data 411, and any other suitable information, may be stored in memory 415. One or more of applications 419 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, multiprocessor systems, microprocessor-based systems, set top boxes, programmable consumer electronics, network PCs, minicomputers, mainframe computers, distributed computing environments that include any of the above systems or devices, quantum computers and the like.

Aspects of the invention may be described in the general context of computer-executable instructions, such as program modules, being executed by a computer. Program modules may include routines, programs, objects, components, data structures, etc., that perform tasks or implement abstract data types. The invention may also be practiced in distributed computing environments where tasks are performed by remote processing devices that are linked through a communications network, e.g., cloud-based applications. In a distributed computing environment, program modules may be in both local and remote computer storage media including memory storage devices.

Figure 5:
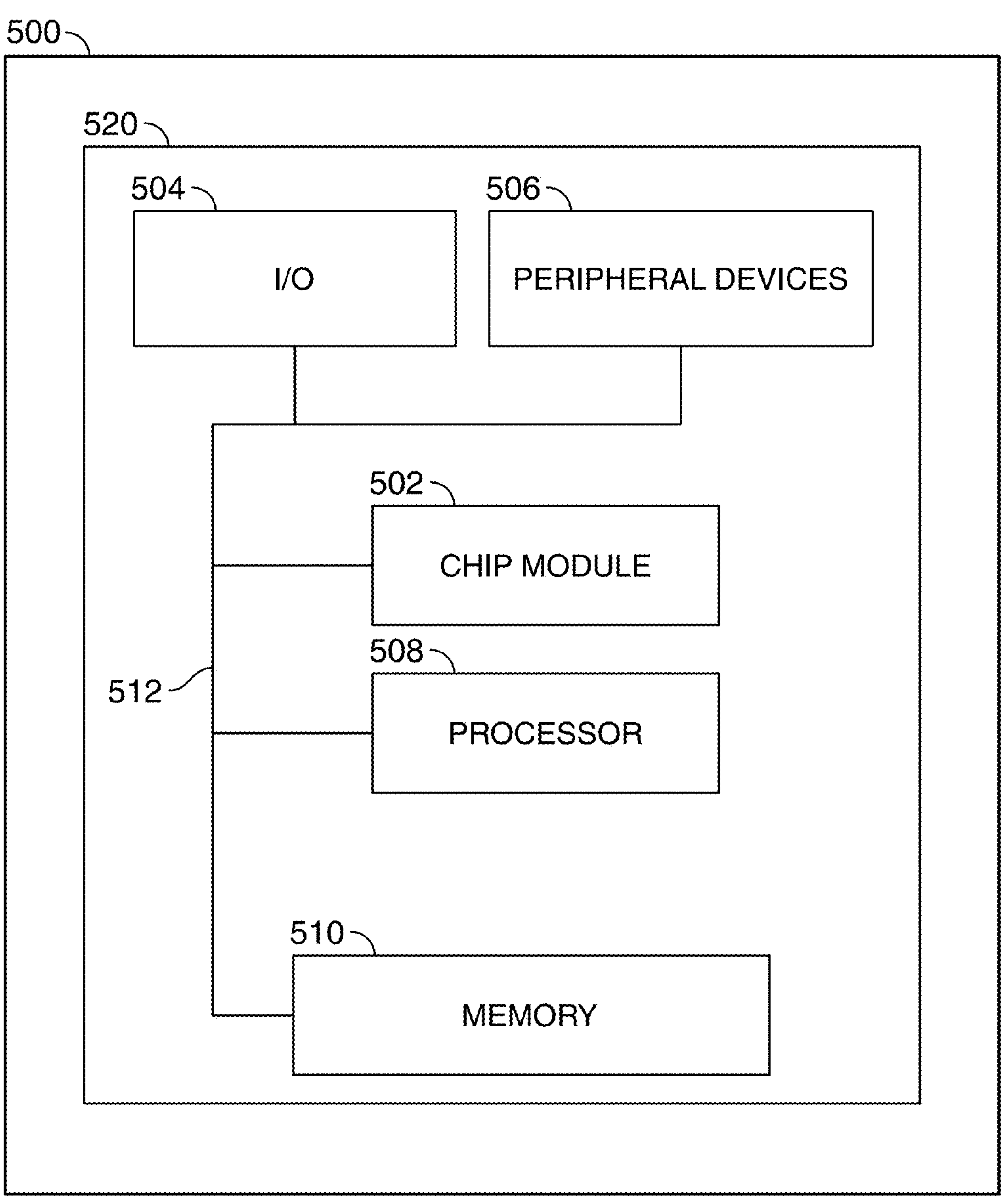
FIG. 5 shows an illustrative block diagram in accordance with principles of the disclosure.

FIG. 5 shows illustrative apparatus 500 that may be configured in accordance with the principles of the disclosure. Apparatus 500 may be a quantum computer, a server, or computer with various peripheral devices 506. Apparatus 500 may include one or more features of the apparatus shown in FIGS. 1, 3 and 4. Apparatus 500 may include chip module 502, which may include one or more quantum and integrated circuits, and which may include logic configured to perform any other suitable logical operations.

Apparatus 500 may include one or more of the following components: I/O circuitry 504, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 506, which may include other computers, logical processing device 508, which may be quantum based and may compute data information and structural parameters of various applications, and machine-readable memory 510.

Machine-readable memory 510 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 502, 504, 506, 508 and 510 may be coupled together by a system bus or other interconnections 512 and may be present on one or more circuit boards such as 520. In some embodiments, the components may be integrated into a single chip. The chip may be silicon-based. The chip may be quantum-based.

Thus, provided may be systems and methods relating to the enhancement of data security by introduction of a layer of data integrity management that is adaptable to changing conditions within a data network. Persons skilled in the art will appreciate that the present invention can be practiced by other than the described embodiments, which are presented for purposes of illustration rather than of limitation. The present invention is limited only by the claims that follow.

What is claimed is:

1. A system for enhancement of data security by introduction of a layer of data integrity management that is adaptable to changing conditions within a data network, the system comprising:

a processor, said processor located and operated by a first party;

a data packet;

a memory storage device;

an algorithm;

the processor configured to:

encrypt the data packet to create an encrypted data packet;

embed the algorithm into the encrypted data packet, said algorithm for performance of steps comprising:

validation of the encrypted data packet against predefined criteria, said predefined criteria comprising cryptographic signatures, access permissions, or a combination thereof; and determination if the encrypted data packet is within a predetermined environment;

wherein the predetermined environment comprises locations related to the first party, locations related to a second party, and locations along a transportation route between the first party and the second party;

store the encrypted data packet in a memory storage device that is in electronic communication with the processor;

transfer the encrypted data packet from the memory storage device to the second party;

the encrypted data packet is configured to:

autonomously execute the embedded algorithm without external processing at a predetermined frequency to validate the encrypted data packet or determine if the encrypted data packet is within the predetermined environment;

when the validation of the encrypted data packet fails, or the encrypted data packet is outside of the predetermined environment:

initiate the algorithm to cause destruction of the encrypted data packet, said destruction of the encrypted data packet is irreversible, wherein the algorithm comprises an erosion algorithm that systematically and irreversibly alters a structure of the encrypted data packet using cryptographic transformation that scrambles and degrades data making reconstruction impossible; and notify an authorized party with an alert message in real-time, said alert message comprising a nature of a breach, a timestamp, an identity of the encrypted data packet that has been affected, or combinations thereof; wherein the predetermined environment further comprises an integrated set of locations including locations of the first party, locations of the second party, and locations along the transportation route between the first party and the second party.

2. The system of claim 1 wherein the predetermined frequency with which the algorithm is run is one or more times per day when the encrypted data packet comprises confidential data.

3. The system of claim 1 wherein encrypting the data packet comprises use of an encryption standard, said encryption standard comprises Triple Data Encryption Standard ("DES"), Advanced Encryption Standard ("AES"), Rivest, Shamir, and Adleman ("RSA") Security, Blowfish, Twofish, Cryptographic Suite for Algebraic Lattices ("CRYSTALS")-Kyber, CRYSTALS-Dilithium, SPHINCS+, or FALCON.

4. The system of claim 1 wherein:

the predefined criteria comprise time-sensitive markers;

the time-sensitive markers comprise an electronic heartbeat;

the encrypted data packet receives the electronic heartbeat from an external source;

the electronic heartbeat provides a signal for maintaining the encrypted data packet; and failure of the encrypted data packet to receive the signal from the electronic heartbeat prompts the algorithm to cause destruction of the encrypted data packet.

5. The system of claim 1 wherein:

the cryptographic signatures comprise a digital signature, an electronic signature, or a combination thereof; and access permissions comprise authorizations given to access the encrypted data packet.

6. The system of claim 1 wherein the destruction of the encrypted data packet comprises degradation of an integrity of data in the encrypted data packet making it futile to interpret or reconstruct.

7. The system of claim 1 wherein the algorithm that causes the destruction of the encrypted data packet is unique to that encrypted data packet.

8. The system of claim 1 wherein the alert message further comprises a status of the encrypted data packet and a location of the encrypted data packet.

9. The system of claim 1 where when the validation of the encrypted data packet fails, or the encrypted data packet is outside of the predetermined environment, the system further comprises the encrypted data packet configured to trigger automated actions, said automated actions comprise data lockdown, access restriction, or combinations thereof.

10. A method for enhancing security of data by introducing a layer of data integrity management that adapts to changing conditions within a data network, the method comprising:

encrypting, using a processor, a data packet to create an encrypted data packet, said processor located and operated by a first party;

embedding, using the processor, an algorithm into the encrypted data packet, said algorithm performing steps comprising:

validating the encrypted data packet against predefined criteria, said predefined criteria comprising cryptographic signatures, access permissions, or combinations thereof; and determining if the encrypted data packet is within a predetermined environment;

storing, using the processor, the encrypted data packet in a memory storage device that is in electronic communication with the processor;

transferring, using the processor, the encrypted data packet from the memory storage device to a second party;

autonomously executing, using the encrypted data packet, the embedded algorithm without external processing at a predetermined frequency to validate the encrypted data packet or determine if the encrypted data packet is within the predetermined environment; and when the validation of the encrypted data packet fails, or the encrypted data packet is outside of the predetermined environment:

initiating, in the encrypted data packet, the algorithm to cause destruction of the encrypted data packet, said destruction of the encrypted data packet is irreversible, wherein the algorithm comprises an erosion algorithm that systematically and irreversibly alters a structure of the encrypted data packet using cryptographic transformation that scrambles and degrades data making reconstruction impossible; and notifying, from the encrypted data packet, an authorized party with an alert message in real-time, said alert message comprising a nature of a breach, a timestamp of when the breach was noticed, and an identification of the encrypted data packet that has been affected;

wherein the predetermined environment comprises an integrated set of locations including locations related to the first party, locations related to the second party, and locations along a transportation route between the first party and the second party.

11. The method of claim 10 wherein the predetermined frequency with which the algorithm is run is one or more times per day when the encrypted data packet comprises confidential data.

12. The method of claim 10 wherein encrypting the data packet comprises use of an encryption standard, said encryption standard comprises Triple Data Encryption Standard ("DES"), Advanced Encryption Standard ("AES"), Rivest, Shamir, and Adleman ("RSA") Security, Blowfish, Twofish, Cryptographic Suite for Algebraic Lattices ("CRYSTALS")-Kyber, CRYSTALS-Dilithium, SPHINCS+, or FALCON.

13. The method of claim 10 wherein:

the predefined criteria comprise time-sensitive markers;

the time-sensitive markers comprise an electronic heartbeat;

the encrypted data packet receives the electronic heartbeat from an external source;

the electronic heartbeat provides a signal for maintaining the encrypted data packet; and failure of the encrypted data packet to receive the signal from the electronic heartbeat prompts the algorithm to cause destruction of the encrypted data packet.

14. The method of claim 10 wherein:

the cryptographic signatures comprise a digital signature, an electronic signature, or a combination thereof; and access permissions comprise authorizations given to access the encrypted data packet.

15. The method of claim 10 wherein the destruction of the encrypted data packet comprises degradation of an integrity of data in the encrypted data packet making it futile to interpret or reconstruct.

16. The method of claim 10 wherein the algorithm that causes the destruction of the encrypted data packet is unique to said encrypted data packet.

17. The method of claim 10 wherein the alert message further comprises a status of the encrypted data packet and a location of the encrypted data packet.

18. A method for enhancing security of data by introducing a layer of data integrity management that adapts to changing conditions within a data network, the method comprising:

encrypting, using a processor, a data packet to create an encrypted data packet, said processor located and operated by a first party;

embedding, using the processor, an algorithm into the encrypted data packet, said algorithm performing steps comprising:

validating the encrypted data packet against predefined criteria, said predefined criteria comprising cryptographic signatures, access permissions, or combinations thereof; and determining if the encrypted data packet is within a predetermined environment;

storing, using the processor, the encrypted data packet in a memory storage device that is in electronic communication with the processor;

transferring, using the processor, the encrypted data packet from the memory storage device to a second party;

autonomously executing, using the encrypted data packet, the embedded algorithm without external processing at a predetermined frequency to validate the encrypted data packet or determine if the encrypted data packet is within the predetermined environment; and when the validation of the encrypted data packet fails, or the encrypted data packet is outside of the predetermined environment, the encrypted data packet:

notifies an authorized party with an alert message in real-time, said alert message comprising a nature of a breach, a timestamp of when the breach was noticed, and an identification of the encrypted data packet that has been affected;

gathers information about surroundings by embedding geolocation data within the encrypted data packet for real-time monitoring and enforcement of geographical boundaries and provides it back to the processor; and triggers automated actions, said automated actions comprising data lockdown, access restriction, or combinations thereof;

wherein:

the predetermined environment comprises an integrated set of locations including locations related to the first party, locations related to the second party, and locations along a transportation route between the first party and the second party;

when the encrypted data packet is outside of its predetermined environment, the encrypted data packet gathers information about the surroundings and provides it back to the processor; and the predefined criteria comprise time-sensitive markers.

19. The method of claim 18 wherein encrypting the data packet comprises use of an encryption standard, said encryption standard comprises Triple Data Encryption Standard ("DES"), Advanced Encryption Standard ("AES"), Rivest, Shamir, and Adleman ("RSA") Security, Blowfish, Twofish, Cryptographic Suite for Algebraic Lattices ("CRYSTALS")-Kyber, CRYSTALS-Dilithium, or SPHINCS+, FALCON.

20. The method of claim 18 wherein:

the cryptographic signatures comprise a digital signature, an electronic signature, or a combination thereof;

access permissions comprise authorizations given to access the encrypted data packet; and the encrypted data packet does not contain confidential data.

* * * * *